US009429772B1

(12) United States Patent
Heinrich et al.

(10) Patent No.: US 9,429,772 B1
(45) Date of Patent: Aug. 30, 2016

(54) EYEGLASS FRAME WITH INPUT AND OUTPUT FUNCTIONALITY

(71) Applicant: Google Inc., Mountain View, CA (US)

(72) Inventors: Mitchell Joseph Heinrich, San Francisco, CA (US); Maj Isabelle Olsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/789,405

(22) Filed: Jul. 1, 2015

Related U.S. Application Data

(63) Continuation of application No. 13/413,936, filed on Mar. 7, 2012, now Pat. No. 9,075,249.

(51) Int. Cl.
*G02C 1/00* (2006.01)
*G02C 11/00* (2006.01)

(52) U.S. Cl.
CPC ..................................... *G02C 11/10* (2013.01)

(58) Field of Classification Search
CPC .... G02C 11/00; G02C 11/10; G02B 27/017; G02B 27/0176; G02B 2027/0178; G02B 2027/0138
USPC .............................................. 351/158; 345/8
See application file for complete search history.

(56) References Cited

U.S. PATENT DOCUMENTS

| 792,763 | A | 6/1905 | Eccleston |
|---|---|---|---|
| 1,025,124 | A | 5/1912 | Corbett |
| D80,311 | S | 1/1930 | Helm |
| D136,048 | S | 7/1943 | Schmid |
| 2,337,617 | A | 12/1943 | Miller, Jr. |
| D167,526 | S | 8/1952 | Murphy |
| D215,032 | S | 8/1969 | Huggins |
| D219,755 | S | 1/1971 | Bloch |
| 3,600,069 | A | 8/1971 | McNeill |
| 3,701,591 | A | 10/1972 | Wichers |
| 3,944,344 | A | 3/1976 | Wichers |
| 4,240,718 | A | 12/1980 | Wichers |
| D267,724 | S | 1/1983 | Staller |
| 4,400,067 | A | 8/1983 | Joffe |

(Continued)

FOREIGN PATENT DOCUMENTS

WO 2010092904 A1 8/2010

OTHER PUBLICATIONS

International Search Report & Written Opinion for Application No. PCT/US2012/050690 dated Feb. 28, 2013.

(Continued)

*Primary Examiner* — Huy K Mai
(74) *Attorney, Agent, or Firm* — Lerner, David, Littenberg, Krumholz & Mentlik, LLP

(57) ABSTRACT

An electronic device includes a frame configured to be worn on the head of a user and having first and second rims with lenses and a bridge between the rims for resting on the nose of the user. First and second temple portions extend away from the rims to ends and are can be positioned over the temples of the user with the ends near the ears of the user. The device further includes a display element over one of the lenses and a housing having an arm portion affixed to the first temple portion. An elbow portion of the housing defines a display end that supports the display element at an angle to the arm portion. Image generating means within the housing can present an image on the display element. An input device on the housing can receive an input from the user.

20 Claims, 11 Drawing Sheets

(56) References Cited

U.S. PATENT DOCUMENTS

| | | |
|---|---|---|
| D274,181 S | 6/1984 | Abate et al. |
| D280,994 S | 10/1985 | Abate |
| 4,867,551 A | 9/1989 | Perera |
| 4,998,815 A | 3/1991 | Lin |
| D327,079 S | 6/1992 | Allen |
| D334,557 S | 4/1993 | Hunter et al. |
| D337,320 S | 7/1993 | Hunter et al. |
| D346,813 S | 5/1994 | McAlpin |
| D354,969 S | 1/1995 | Garcia |
| D354,974 S | 1/1995 | Wielhouwer |
| D356,286 S | 3/1995 | Shink |
| 5,469,229 A | 11/1995 | Greenbaum |
| D366,888 S | 2/1996 | Locquiao |
| 5,533,207 A | 7/1996 | Diaz |
| 5,539,422 A | 7/1996 | Heacock et al. |
| D375,111 S | 10/1996 | Wielhouwer |
| 5,729,321 A | 3/1998 | Wielhouwer |
| D402,651 S | 12/1998 | Depay et al. |
| 5,953,096 A | 9/1999 | Friedman |
| 6,023,372 A * | 2/2000 | Spitzer ............... G02B 27/017 345/8 |
| 6,034,653 A | 3/2000 | Robertson et al. |
| D428,620 S | 7/2000 | Maturaporn |
| D429,253 S | 8/2000 | Robertson et al. |
| D431,042 S | 9/2000 | Lin |
| D436,960 S | 1/2001 | Budd et al. |
| 6,747,611 B1 | 6/2004 | Budd et al. |
| 6,779,886 B2 | 8/2004 | Huang |
| 6,945,648 B2 | 9/2005 | Schindler et al. |
| D512,985 S | 12/2005 | Travers et al. |
| D523,461 S | 6/2006 | Jannard et al. |
| D533,893 S | 12/2006 | Canavan et al. |
| 7,158,096 B1 | 1/2007 | Spitzer |
| D537,078 S | 2/2007 | Tanaka et al. |
| 7,219,993 B1 | 5/2007 | Chiou |
| 7,284,853 B2 | 10/2007 | Friedman |
| D559,250 S | 1/2008 | Pombo |
| D565,082 S | 3/2008 | McClure et al. |
| D566,744 S | 4/2008 | Travers et al. |
| 7,360,889 B2 | 4/2008 | Yong |
| D571,838 S | 6/2008 | Yee |
| D578,120 S | 10/2008 | Lowe et al. |
| 7,470,022 B2 | 12/2008 | Lerner |
| 7,475,981 B2 | 1/2009 | Yong |
| 7,517,082 B2 | 4/2009 | Huang |
| D593,146 S | 5/2009 | Powless |
| D602,064 S | 10/2009 | Mitsui et al. |
| 7,600,871 B2 | 10/2009 | Lane et al. |
| 7,631,968 B1 | 12/2009 | Dobson et al. |
| 7,648,236 B1 | 1/2010 | Dobson |
| 7,663,805 B2 | 2/2010 | Zaloum et al. |
| 7,675,683 B2 | 3/2010 | Dobson et al. |
| D616,486 S | 5/2010 | Carlow et al. |
| 7,753,520 B2 | 7/2010 | Fuziak, Jr. |
| 7,782,589 B2 | 8/2010 | Menduni et al. |
| 7,843,403 B2 | 11/2010 | Spitzer |
| D636,809 S | 4/2011 | Hwang et al. |
| 8,000,000 B2 | 8/2011 | Greenberg et al. |
| D645,492 S | 9/2011 | Zhao |
| D646,316 S | 10/2011 | Zhao |
| D647,123 S | 10/2011 | Cho |
| 8,029,132 B1 | 10/2011 | Park |
| D649,177 S | 11/2011 | Cho et al. |
| D658,812 S | 5/2012 | Miller, IV et al. |
| D659,137 S | 5/2012 | Matsumoto |
| D659,739 S | 5/2012 | Olsson et al. |
| D659,741 S | 5/2012 | Heinrich et al. |
| D660,341 S | 5/2012 | Olsson et al. |
| D662,964 S | 7/2012 | Olsson et al. |
| D662,966 S | 7/2012 | Jeon |
| D664,184 S | 7/2012 | Olsson et al. |
| D664,185 S | 7/2012 | Heinrich et al. |
| D664,586 S | 7/2012 | Olsson |
| D666,237 S | 8/2012 | Olsson et al. |
| D669,066 S | 10/2012 | Olsson et al. |
| D671,589 S | 11/2012 | Olsson |
| D671,590 S | 11/2012 | Klinar et al. |
| D680,152 S | 4/2013 | Olsson et al. |
| D684,321 S | 6/2013 | Gill |
| D687,087 S | 7/2013 | Iurilli |
| D687,828 S | 8/2013 | Sato et al. |
| D688,294 S | 8/2013 | Roy et al. |
| 8,542,326 B2 | 9/2013 | MacNaughton et al. |
| D691,602 S | 10/2013 | Sugihara et al. |
| D692,424 S | 10/2013 | Pombo et al. |
| D697,962 S | 1/2014 | Olsson |
| D698,383 S | 1/2014 | Hong |
| 8,622,542 B2 | 1/2014 | Takahashi |
| D701,506 S | 3/2014 | Pombo |
| D703,724 S | 4/2014 | Olsson |
| D704,705 S | 5/2014 | Mehin et al. |
| D706,859 S | 6/2014 | Markovitz et al. |
| D709,122 S | 7/2014 | Markovitz et al. |
| D710,928 S | 8/2014 | Heinrich et al. |
| D711,375 S | 8/2014 | Lee et al. |
| D711,376 S | 8/2014 | Lee et al. |
| D715,295 S | 10/2014 | Lee et al. |
| D716,299 S | 10/2014 | Olsson et al. |
| D727,317 S | 4/2015 | Olsson et al. |
| 9,075,249 B2 * | 7/2015 | Heinrich ............... G02C 11/10 |
| 2001/0055093 A1 | 12/2001 | Saitoh et al. |
| 2002/0021407 A1 | 2/2002 | Elliott |
| 2005/0219152 A1 | 10/2005 | Budd et al. |
| 2005/0237271 A1 | 10/2005 | Yamamoto |
| 2006/0012884 A1 * | 1/2006 | Snorteland ............ B60R 11/02 359/630 |
| 2006/0158608 A1 | 7/2006 | Lin |
| 2007/0046891 A1 | 3/2007 | Niu |
| 2007/0052672 A1 | 3/2007 | Ritter et al. |
| 2008/0143951 A1 | 6/2008 | Won |
| 2008/0169998 A1 * | 7/2008 | Jacobsen ............ G02B 27/0172 345/8 |
| 2008/0198324 A1 | 8/2008 | Fuziak |
| 2009/0066863 A1 | 3/2009 | Chen |
| 2009/0201460 A1 | 8/2009 | Blum et al. |
| 2010/0045928 A1 | 2/2010 | Levy |
| 2010/0073262 A1 | 3/2010 | Matsumoto |
| 2010/0110368 A1 * | 5/2010 | Chaum ............... G02B 27/017 351/158 |
| 2010/0149073 A1 | 6/2010 | Chaum et al. |
| 2010/0157433 A1 | 6/2010 | Mukawa et al. |
| 2010/0188314 A1 | 7/2010 | Miyake et al. |
| 2011/0012814 A1 | 1/2011 | Tanaka |
| 2011/0213664 A1 | 9/2011 | Osterhout et al. |
| 2012/0218507 A1 | 8/2012 | Calilung et al. |
| 2013/0044042 A1 | 2/2013 | Olsson et al. |
| 2013/0188080 A1 | 7/2013 | Olsson et al. |

OTHER PUBLICATIONS

International Search Report and Written Opinion for Application No. PCT/US2013/029019 dated Jun. 3, 2013.
International Search Report for Application No. PCT/US2014/016030 dated May 27, 2014.

* cited by examiner

EYEGLASS FRAME WITH INPUT AND OUTPUT FUNCTIONALITY

CROSS-REFERENCES TO RELATED APPLICATIONS

The present application is a continuation of U.S. patent application Ser. No. 13/413,936, filed on Mar. 7, 2012, the disclosure of which is incorporated herein by reference.

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms.

BRIEF SUMMARY

An aspect of the present disclosure relates to an electronic device, including a frame configured to be worn on the head of a user. The frame includes first and second rims with lenses affixed therein and a bridge portion positioned between the first and second rims and configured to rest on a portion of the nose of the user. The frame further includes first and second temple portions extending away from the rims to respective ends thereof and configured to be positioned over respective first and second temples of the user with the ends disposed near first and second ears of the user. The device further includes a display element positionable over one of the first and second lenses and a housing having an arm portion affixed to the first temple portion of the frame and defining a longitudinal axis. The housing also includes an elbow portion defining a display end of the housing and supporting the display element such that the display element extends along a display axis that is angled with respect to the longitudinal axis. Image generating means are disposed within the housing and are configured for generating an image presentable to the user on the display element. An input device is affixed to the housing and is configured for receiving from the user an input associated with a function, the function being related to information that is presentable on the display element.

The elbow portion can be configured to extend at least partially along the longitudinal axis through a portion thereof that is adjacent the temple portion such that the display element can be positioned at a distance away from the respective lens in a direction along the display axis. Further, the arm portion of the housing can contact the temple portion of the frame, and the elbow portion of the housing can be spaced apart from the frame. The elbow portion can be curved so as to extend away from the arm portion in an arcuate fashion to the display end of the housing. The arm portion and the elbow portion can be discrete elements rotatably affixed to each other about an axis substantially parallel to the display axis such that the display element can be adjustable toward and away from a brow of the user by rotation of the elbow portion relative to the arm portion. The display axis can be angled at between about 80° and 100° with respect to the longitudinal axis.

The input device can be positioned in the arm portion, and the image generating means can be positioned in the elbow portion. The housing of the operational unit can define an outer wall, and the input device can include touch-sensitive circuitry disposed within the housing such that at least a portion of the outer wall of the housing is configured as a touch-based input surface. The housing within the arm portion can overlie the first temple portion such that the touch-based input surface is positioned along the temple portion. The arm portion of the housing can be removably affixed to the first temple portion of the frame.

The first and second temple portions can be rotatably affixed to the rims such that frame is selectively positionable in a folded configuration and a wearable configuration.

The display element can be a generally transparent prism configured to combine the image presentable to the user thereon with a user view through the display element.

Another aspect of the present disclosure relates to an electronic device, including a frame configured to be worn on the head of a user. The frame includes first and second rims with lenses affixed therein and a bridge portion positioned between the first and second rims and configured to rest on a portion of the nose of the user. The frame further includes first and second temple portions extending away from the rims to respective ends thereof that are configured to be positioned over respective first and second temples of the user with the ends disposed near first and second ears of the user. The device further includes a display element positionable over one of the first and second lenses and a housing having an arm portion affixed to the first temple portion of the frame and defining a longitudinal axis, the housing also including an elbow portion defining a display end of the housing and supporting the display element such that the display element extends along a display axis that is angled with respect to the longitudinal axis. Control circuitry is disposed within the housing, and includes image generating means configured for generating an image presentable to the user on the display element. The device further includes a camera having a lens thereof mounted within the frame such that the camera lens is exposed and is directed substantially parallel to the longitudinal axis. The camera is electrically connected with the control circuitry through the frame.

The housing can further include an outer wall configured as a touch-based input surface connected with the control circuitry and adapted for receiving from the user an input associated with a function that can be related to information that is presentable on the display element.

The camera can be mounted within the bridge portion of the frame. Alternatively, the camera can be mounted within the second temple portion. The second temple portion can include a camera housing portion in which the camera is mounted. In such an example, the camera lens can be exposed on the camera housing portion. The camera housing portion can include a side wall and input means disposed along the side wall.

Another aspect of the present disclosure relates to an electronic device, including a frame configured to be worn on the head of a user. The frame includes first and second rims with lenses affixed therein and a bridge portion positioned between the first and second rims. The bridge portion is configured to rest on a portion of the nose of the user. First and second temple portions extending away from the rims to respective ends thereof and are configured to be positioned over respective first and second temples of the user. The frame further includes an electronics housing affixed on the end of the first temple portion and having a portion that is configured to extend around at least a portion of an ear of the user adjacent the first temple, the electronics housing containing an electronic element therein. The device further includes a display element positionable over one of the first and second lenses and a housing having an arm portion affixed to the first temple portion of the frame and defining a longitudinal axis. The housing also has an elbow portion defining a display end of the housing and supporting the display element such that the display element extends along a display axis that is angled with respect to the longitudinal axis. Image generating means are disposed within the housing and are configured for generating an image presentable to the user on the display element. The image generating means are electrically connected with the electronic element of the frame.

The electronic element can include conductive connections configured for connecting with a battery. The conductive connections can be further configured to provide electronic power from such a battery to the image generating means, and the electronics housing can be further configured to enclose such a battery.

The housing can be positioned on a first side of the ear of the user such that it exerts a first weight force at a point disposed on the first side of the ear, and the electronics housing can be configured to exert a second weight force disposed on a second side of the ear of the user. The electronics housing can be further configured such that the first weight force and the second weight force contribute to an overall weight of the device that is distributed among the nose of the user and the ear of the user such that a majority of the overall weight is applied to the ear.

DETAILED DESCRIPTION

Figure 1:
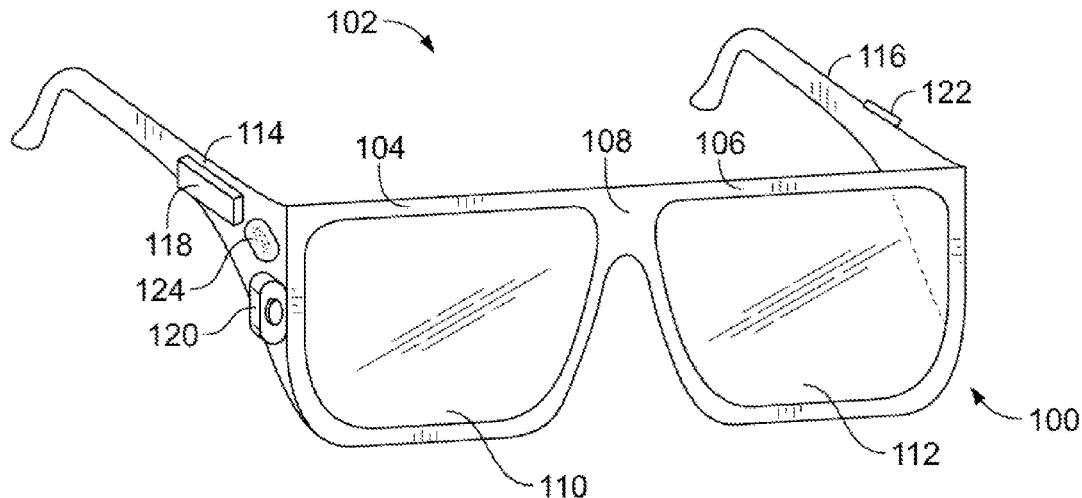
FIG. 1 shows an exemplary system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened 20 surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
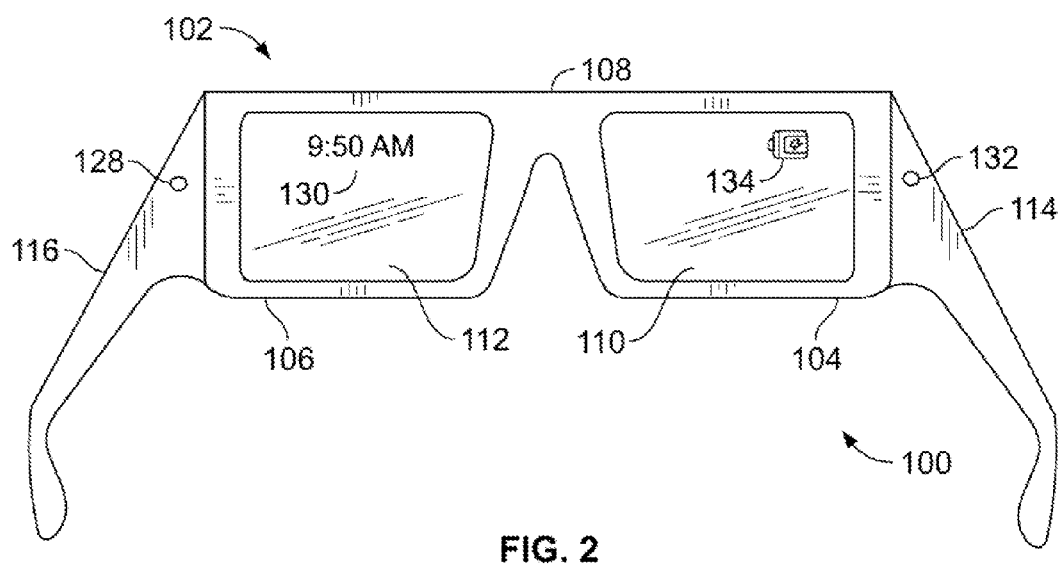
FIG. 2 shows an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
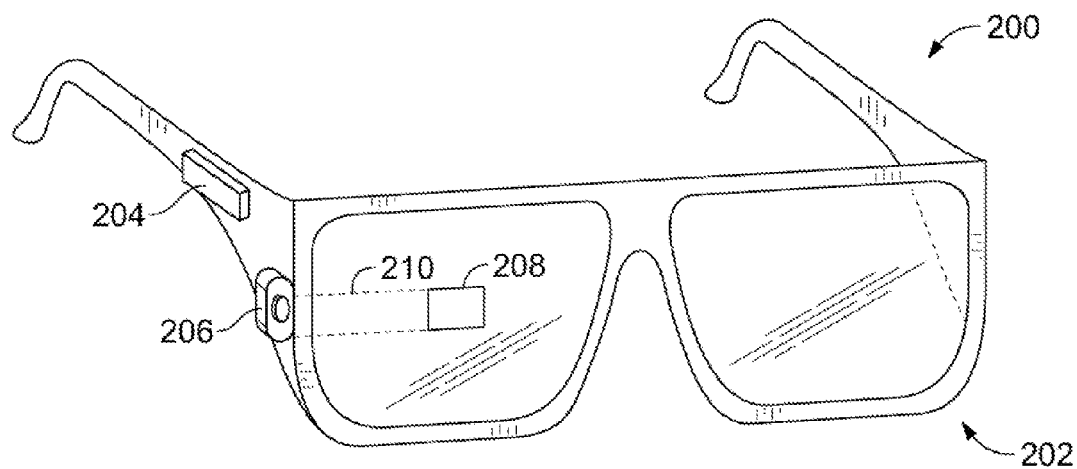
FIG. 3A shows an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
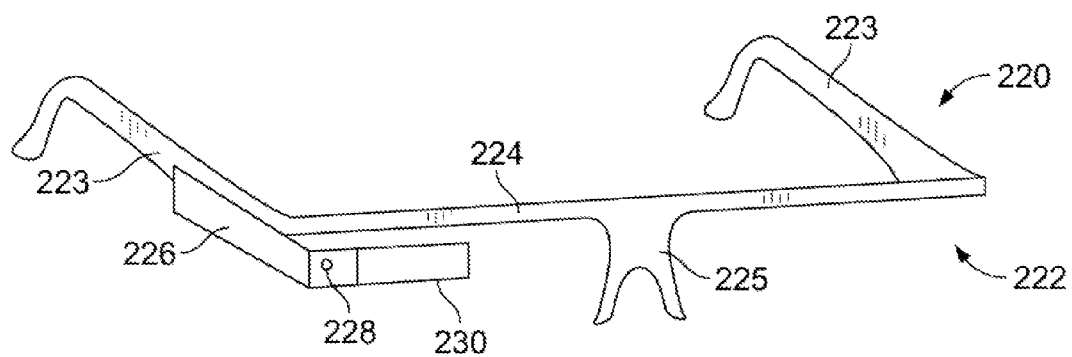
FIG. 3B shows another example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
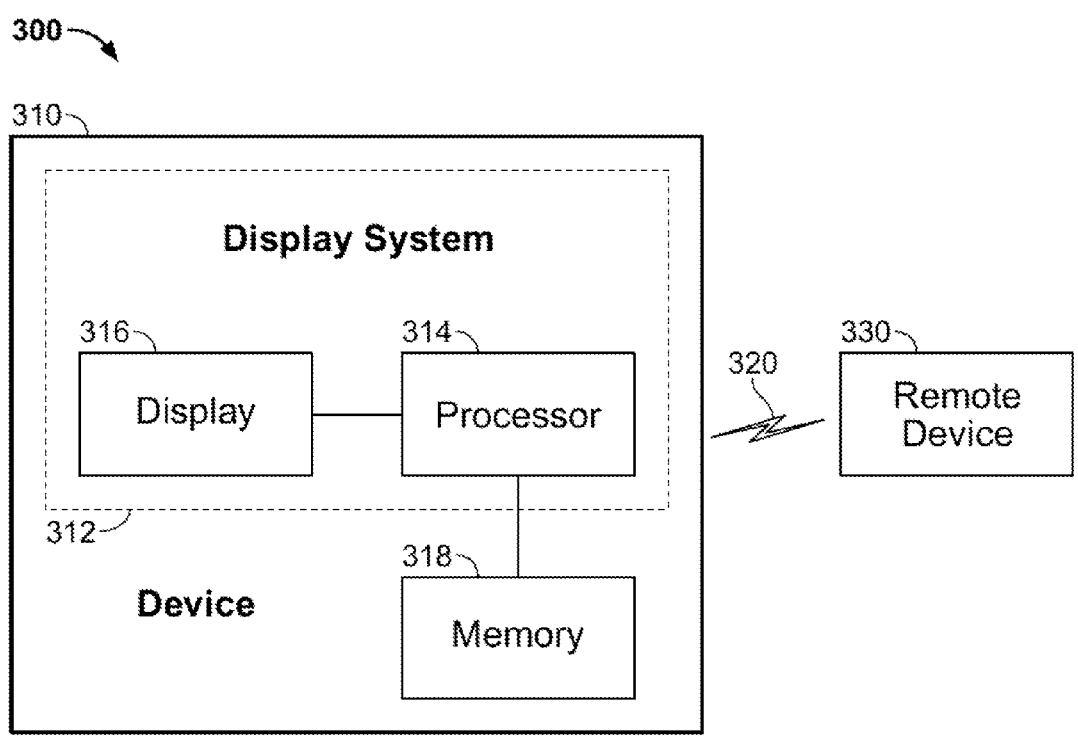
FIG. 4 shows an example architecture for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
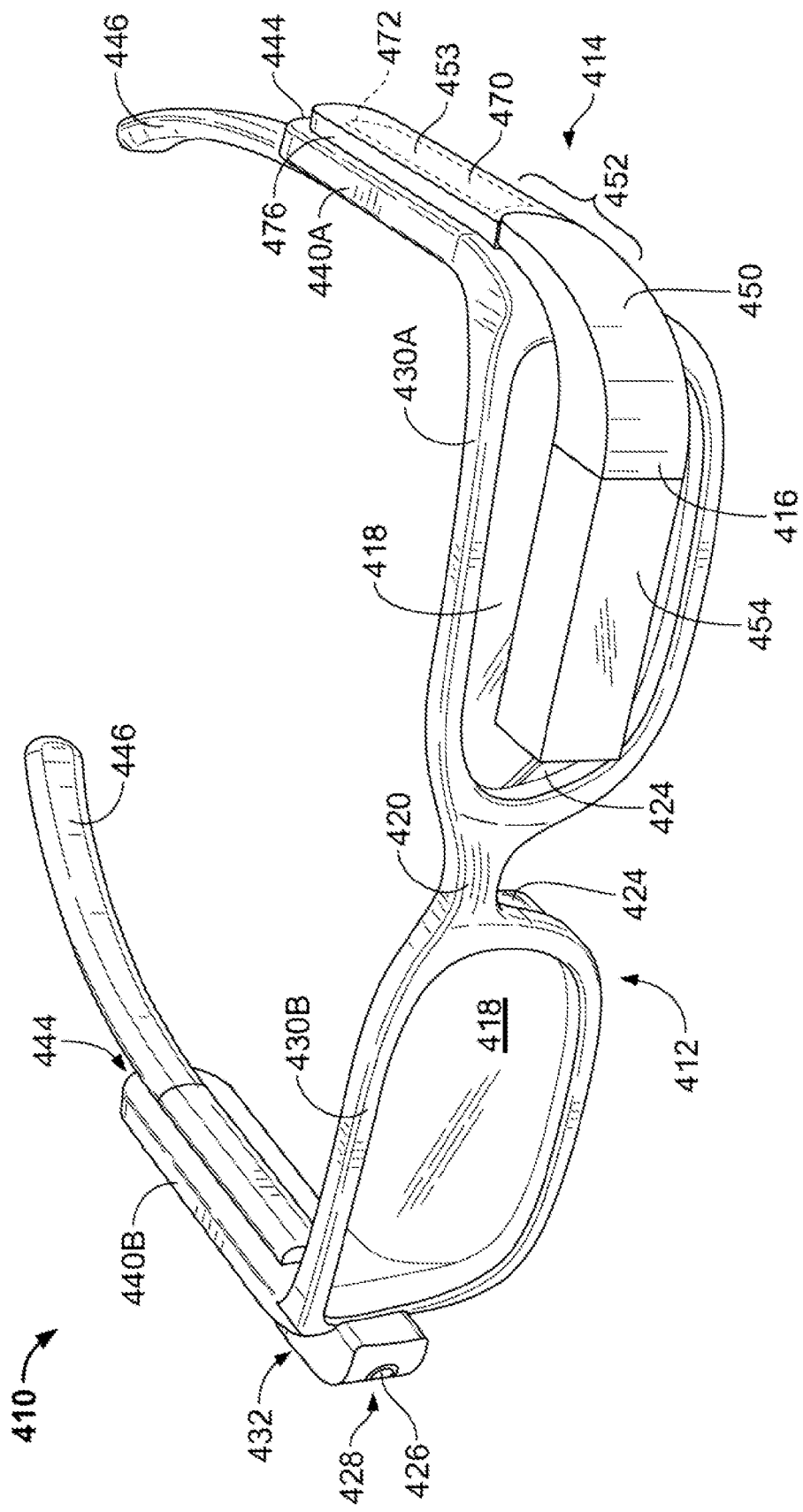
FIG. 5 shows a wearable computer device according to an embodiment of the present disclosure.
Figure 6:
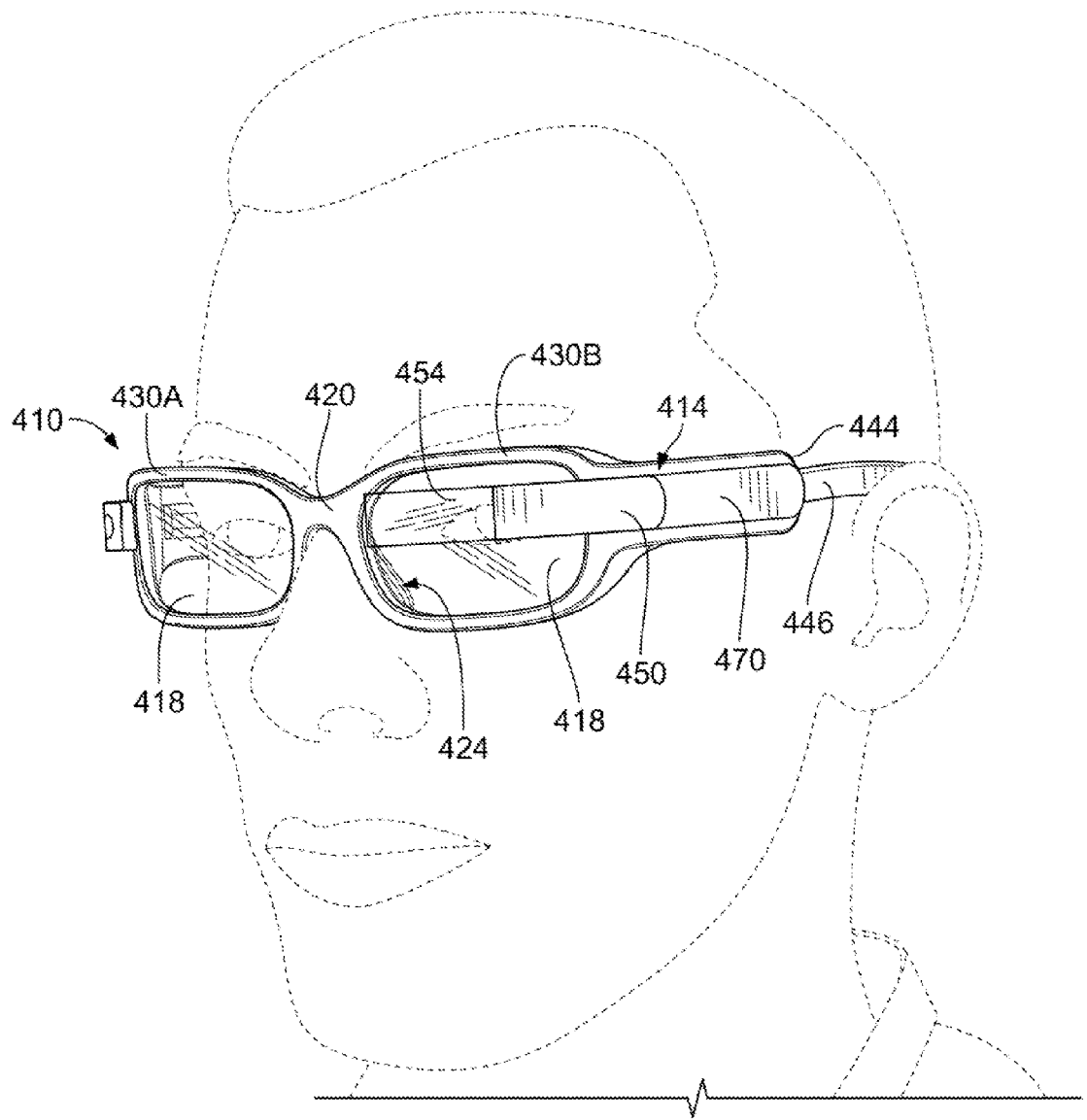
FIG. 6 shows the device of FIG. 5 being worn on the head of a user.

FIGS. 5-12, which do not adhere to the same numbering scheme used in FIGS. 1-4, illustrate a embodiments of a wearable device that can implement the various systems discussed above with reference to FIGS. 1-4. FIG. 5 shows an embodiment of a device 410 that is wearable on the head of the user (in a similar fashion to the embodiment shown in FIG. 6). As will be described in greater detail below, device 410 includes a wearable structure in the form of an eyeglass frame 412 that can be similar to a frame associated with prescription glasses or sunglasses. Frame 412 can provide the desired fit of device 410 on a user's head. Device 410 further includes a boom 414 that extends from a portion of frame 412 to a free end 416 thereof that includes a display element 454. Boom 414 is affixed to frame 412 such that, when device 410 is properly worn by a user, display 454 of boom 414 can be positioned adjacent the user's eye, opposite any adjacent lens 418 for making an image presented thereon viewable by the user when viewed through the lens 418 supported by frame 412. In this manner, the boom 414 is configured as a unit of the device 410 that carries out at least one operation of the device 410, namely presenting an image to the user. Additional operations can also be carried out by boom 414, which can also include an input device in the form of a touch-based input 470 that is accessible to the user to receive a touch input from the user to execute a control function of the device assembly 410 or a function of another electronic device that is connected or in communication with device assembly 410.

Frame 412 can include one or more rims 430 that extend in lateral directions away from a central bridge 420. The embodiment shown includes two rims 430A and 430B, each extending away from opposite sides of bridge 420. Rims 430A,430B are shaped to extend laterally past respective ones the wearer's eyes while being positioned at least above the eye so as to not obstruct the wearer's vision. Rims 430 are further structured to hold respective lenses 418 over the user's eyes. As such, in some embodiments rims 430 can fully encircle lenses 418 and, accordingly, the user's eyes. Other "half-rimed" or "rimless" configurations can be implemented in a similar structure. For example, glasses generally referred to as rimless include a bridge and respective arms directly attached to lenses. In such an embodiment, the structure of the overall frame given by the lenses can be considered equivalent to rims that are integral with the lenses. Additionally, lenses can be assembled with a band 613, similar to that shown in FIGS. 10 and 11, in which the lenses 618 extend downwardly from the band 613 to cover the user's eyes. Returning to FIG. 4, number of different shapes and structures are possible for rims 430A,430B, in addition to what is shown in the figures. The specific shape of rims 430A,430B can depend on the shape and structure of bridge portion 420 or lenses 418 or can be configured for aesthetic or stylistic purposes.

Rims 430A,430B can be of the same or a different material from bridge 420. Examples of suitable materials for the rims 430, or any other part of frame 412, can include various types of thermoplastic such as polycarbonate, acrylic, ABS, and polyethylene or resin plastics such as urethane or the like. Any parts of frame 412, including the bridge 420 and rims 430, can be made from metal such as aluminum, stainless steel, titanium, nickel, gold, or various alloys including one or more of the metals listed or similar metals. Rims 430 can be monolithically formed with bridge 420 from the same material, or rims 430 and bridge 420 can be made from different materials and affixed together using adhesives, screws, various forms of welding, soldering, braising, or the like.

Bridge 420 and rims 430A and 430B can be arranged to provide a structure that allows frame 412 to rest on the nose of a user. As shown, rims 430A and 430B can extend away from bridge 420 along a portion thereof to conform generally to the shape of a nose. Further, bridge 420 can also be shaped to extend over the nose, either in contact therewith or spaced apart therefrom. In an embodiment, rims 430A and 430B can include respective nose pads 424 that can provide a greater area of contact with the user's nose. In an alternative structure, such as that shown in FIG. 10, bridge 620 can include a pair of arms 622 that extend downward therefrom to support pads 624 that are separate from any rims 630A or 630B present in frame 612. The description of bridge arms 622 extending downward from bridge 620 is made in such a reference frame and is done for purposes of the present description. Discussion of any other relative reference directions is also made for similar purposes and none are intended to be limiting with respect to the present disclosure, unless explicitly stated. Pads 624 can be made of a material that is softer than arms 622 for purposes of comfort. Additionally the material that pads 624 are made from can be flexible or have a texture that prevents slippage along the surface of the user's nose.

Bridge arms 622 can be flexible to further provide a comfortable fit and or grip on the user's nose. Further, bridge arms 622 can be deformably bendable and repositionable so that the position of pads 624 can be changed to best fit the user. This can include movement closer together or farther apart or fore and aft relative to bridge 620, which can adjust the height of bridge 620 and, accordingly, the position of boom 614 and its display 654 relative to the user's eye. Further adjustment of display and other structures thereof can be similar to those in the embodiments described above, as can the structures used to affix boom 614 to frame band 614. In other embodiments, structures similar to arms and pads can be integrally formed with bridge 620 and can be structured such that larger or smaller areas of the bridge 620 contact the nose of the user, compared to the embodiment shown. In the embodiment shown in FIG. 5, the integrated nose pads 424 can be deformable or flexible to allow comfortable and adjustable fit in a similar manner to the bridge arms discussed with respect to FIG. 10.

As further shown in FIG. 5, frame 412 also includes one or more arms 440A,440B that extend from the rims 430A, 430B, past the user's temple, and toward the user's ear. Frame 412 can include two arms 440A,440B that can be positioned to extend in a rearward direction from respective rims 430A,430B. Arms 440A,440B may provide additional points, or areas, of contact with the user's head and contribute to the device's fit and retention to the user's head. Arms 440A,440B can be similar in structure or function to corresponding features of eyeglasses.

Arms 440A,440B can be integrally formed with respective rims 430A,430B. Alternatively, arms 440A,440B can be affixed to respective rims 430A,430B using a hinge arranged to permit arms 440A,440B to be folded inward toward rims 430A,430B for storage or transportation. If hinges are used, they can be spring-loaded or the like to apply a comfortable pressure against the user's head or to accommodate a range of different head sizes comfortably. In some embodiments, arms 440 can be made of a plastic material with internal metal reinforcement to allow bending or to prevent breakage. Arms 440A,440B can be configured to contact the head of the user along respective temples or in the area of respective ears of the user.

Arms 440A,440B include respective free ends 444 opposite the respective rims 430A,430B. Free ends 444 can be positioned to be located near the ear of a user when wearing device assembly 410. Ear portions 446 can be affixed to or integrally formed with the free ends 444 of the arms 440A, 440B. As shown in FIG. 5 ear portions 446 can include an arched, or curved, form such that they bend behind a portion of the rear of the user's ear. As with eyeglasses, the particular shape of ear portions 446 can vary in many ways including the amount by which they bend, the distance around the ear which they extend and the amount of contact, if any, actually maintained with the outside of the ear. In the example shown, ear portions 446 can have a subtly-arched form; however, other embodiments of ear portions can have a more pronounced curvature, such as those shown in FIGS. 9 and 10. In some embodiments, such as those discussed below with respect to FIG. 9, ear portions 446 can be configured to include various electronic components. Such electronic components can include batteries, control circuitry, communication devices, and the like, which can be connected with a boom by wires, traces or the like embedded within the arms. Further, ear portions 446 can be slidably attached to arms 440A,440B to allow the wearer to adjust the position of ear portions 446 to achieve a customized fit. Further, ear portions 446 can bend inward to apply a pressure to the side of the wearer's head in the area of the respective ears.

Arms 440A and 440B can be structured to appropriately position ear portions 446 relative to rims 430A,430B to achieve an appropriate fit for a user or a selection of different users. The shape of arms 440 can, accordingly, depend on the size and shape of rims 430A,430B. For example, arms 440 can extend substantially rearward from their respective rims 430A,430B substantially perpendicular thereto and can be substantially straight. In other embodiments, arms 440 can be angled inward, outward, upward, or downward relative to the outside ends of rims 430 and can further be curved in any direction (or multiple directions) to achieve a desired fit or aesthetic quality.

In the embodiment shown, display 454 is in the form of a generally-transparent prism that is configured to overlay or combine with the user's sight an image generated by electronic display components that are positioned within the housing 452. Such a prism can be structured to receive a projected image in a receiving side 458 and to make that image visible to a user by looking into a viewing side 460 of display 454. This can be done by configuring display 454 with a specific shape and or material characteristics. In the embodiment of FIG. 5 the receiving side 458 of display 454 is adjacent to or within housing 452 such that the electronic components inside housing 452 can contain a video projector structured to project the desired video image into receiving side 458 of prism 454. Such projectors can include an image source such as LCD, CRT, and OLED displays and a lens, if needed, for focusing the image on an appropriate area of prism 454. The electronic components associated with display 454 can also include control circuitry for causing the projector to generate the desired image based on a video signal received thereby. Other types of displays and image sources are discussed herein and can also be incorporated into boom 414. Further, a display can be in the form of a video screen consisting of, for example, a transparent substrate. In such an example, the image generating means can be circuitry for a LCD display, a CRT display or the like positioned directly behind the screen such that the overall display is not transparent. The housing of the boom can extend behind the display and the image generating means to enclose the image generating means in such an embodiment.

The receiving surface 458 of display 454 can be perpendicular to the viewing surface 460 of prism 454 such that a transparent prism can be used to combine the projected image with the view of the environment surrounding the wearer of the device. This would allow the user to observe both the surrounding environment and the image projected into prism 454. The prism 454 and the display electronics can be configured to present an opaque or semi-transparent image, or combinations thereof, to achieve various desired image combinations.

As discussed above, an input device in the form of a touch-based input 470 is also desirably included in or on boom 414. In the embodiment shown, housing 452 defines an arm portion 476 that can be elongated and can extend at an angle relative to display 454 (which is shown having an elongated shape so as to define a longitudinal axis therethrough). As shown in the figures, arm portion 476 can extend at an angle that can range from about 80° to about 110°. In an embodiment, display 454 is angled with respect to arm portion 476 at approximately 90°. Housing 452 can further be formed to define an elbow portion 450 that supports display 454 relative to arm portion 476 at the desired angle. Elbow portion 450 can be curved, as shown in the figures, or can include a bend formed by a sharp corner or can be configured such that display 454 projects directly outwardly from near arm portion 476 at the desired angle. In an embodiment, the image source associated with display 454 and its related circuitry can be held within housing 452 in elbow portion 450 thereof. Touch-based input can be positioned within arm portion 476 such that, when display 454 is positioned over a user's eye, arm portion 476 is positioned such that it extends over the user's temple adjacent that eye.

Touch-based input 470 can be a touchpad or trackpad-type device configured to sense at least one of a position and a movement of a finger via capacitive sensing, resistance sensing, or a surface acoustic wave process, among other possibilities. Touch-based input 470 can further be capable of sensing finger movement in a direction parallel or planar to a surface thereof, in a direction normal to the surface, or both, and may also be capable of sensing a level of pressure applied thereto. Touch-based input 470 can be formed having an outer layer of one or more insulating, or dielectric, layers that can be opaque, translucent, or transparent and an inner layer of one or more conducting layers that can be opaque, transparent, or translucent.

In an embodiment, the outer layer of the touch-based input 470 can be a portion of an outer wall 453 of housing 452. This can provide a seamless or uniform incorporation of touch-based input 470 into housing 452. The housing can define an interior cavity for containing the inner layer of the touch-based input 470 and any electrical structures, such as control circuitry, associated therewith. The outer layer of the touch-based input 470 can include the entire wall 453 or a selected operable area 472 in the form of one or more touch-surfaces 470 thereof, as dictated by the size, shape, and position of the inner layer of the touch-based input 470. If a portion of the housing is to be used as the outer layer of the touch-based input 470, then the housing 452 can be made of a dielectric material such as plastic. In an alternative embodiment, the touch-based input can be a discrete element that is mounted in an opening in the housing 452 that includes its own dielectric outer layer, separate from wall 453 to define the operable area within a window or opening through wall 453 in a manner similar to a touchpad on a laptop computer.

In the embodiment shown, touch-based input 470 is positioned on arm portion 476 and defines a vertical plane that overlies a portion of the side of the user's head. Accordingly, touch-based input 470 may not be visible to a user of the assembly 410, when it is being worn. To help the user identify any operable areas 472 of touch-based input 470 the housing 476 can be formed to have a texture provided by a raised, indented, or roughened surface so as to provide tactile feedback to a user when the user's finger contacts the touch surface 472. Such a texture can define the boundaries of the operable area 472, can be consistent through the operable area 472, or can vary along horizontal and vertical lengths of the operable area 472 to give the user feedback as to the location of a finger contacting operable area 472.

Touch-based input 470 can also include additional operable areas 472 on wall 453 or on other portions of housing 452, such as the top or bottom surfaces thereof. This can be achieved by positioning capacitive sensor layers, for example, beneath the selected housing surfaces. In other embodiments, additional touch-based inputs can be provided in different locations of boom 413 such as on elbow portion 450. Each of the touch-based inputs 470 can be operated independently, and can provide different functions. Additionally, housing 452 can include additional input structures, such as a button (not shown) that can provide additional functionality for boom 414, including implementing a lock or sleep feature or allowing a user to toggle the power for boom 414 between on and off states. In an example, such a button can be configured to signal circuitry within boom 414 to capture an image (i.e. to "take a picture") using camera 426. Such a button can similar in function and location to the button described in the co-pending, commonly-assigned U.S. patent application Ser. No. 13/353,445, the entire disclosure of which is incorporated by reference herein.

Touch-based input 470, or another type of input, can be used to provide a control function that is executed by boom 414, such as by an on-board CPU or a CPU mounted to or within an associated wearable structure, or by a remote device, such as a smartphone or a laptop computer. In an embodiment information related to the control function is viewable by the user on display 454. In one example, the control function is the selection of a menu item. In such an example, a menu with a list of options can be presented on display 454. The user can move a cursor or can scroll through highlighted options by predetermined movement of a finger along touch-based input 470 and can confirm the selection by a different movement, the acceptance of the selection being indicated by the display. Examples of menu item selections can include whether to answer or decline an incoming call on a remotely-linked smartphone or to scroll or zoom-in on a map presented in display.

Boom 414 can attach to frame 412 using any one of a number of different structures. In some embodiments it may be advantageous to make such attachment between a location on the arm portion 476 of housing 452 and a location along a corresponding arm 440A or 440B of frame 412. Boom 414 can be affixed to frame 412 on either arm 440A or arm 440B thereof to position the display 454 over either the user's right eye or the user's left eye. In an embodiment, boom affixes at its arm portion 476 to one of the arms 440A or 440B of frame 412 with the arm portion 476 such that when worn it extends along the temple of the user on the side of the arm 440A or 440B toward the front of the user's face. To properly position display 450 at a distance away from the user's eye, arm portion 476 can extend along a longitudinal axis thereof that is tangent to a portion of the arm 440A or 440B (which can be at the point or within the area of attachment) and continues to extend along the longitudinal axis as the frame 412 curves or bends inward to attach with the corresponding rim 430A or 430B. This allows for at least approximately appropriate positioning of display 454 over the user's eye on the side of the arm 440A or 440B to which the boom 414 is attached given the angle at which elbow portion 450 positions display 454 relative to arm 476 of housing 452.

Figure 7A:
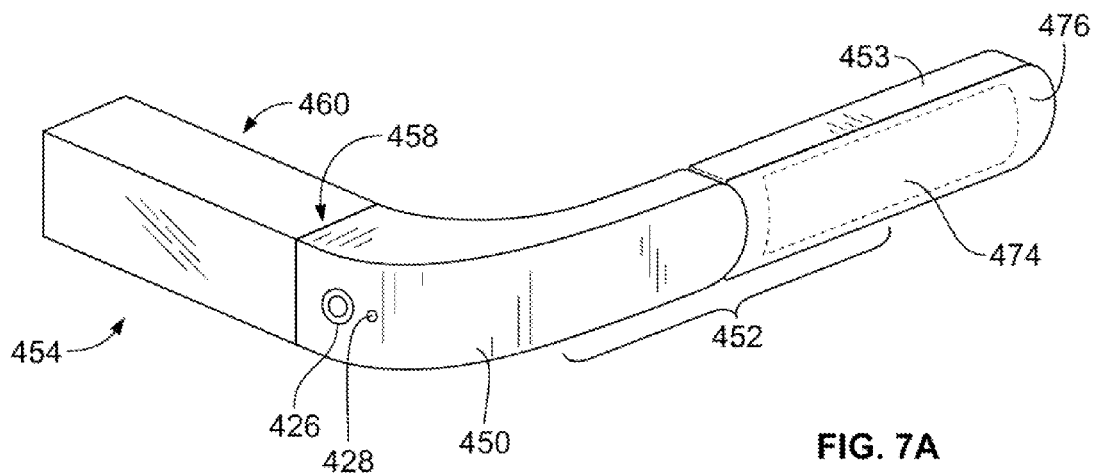
FIGS. 7A-7C show the device of FIG. 5 in exemplary adjustment configurations thereof.
Figure 7B:
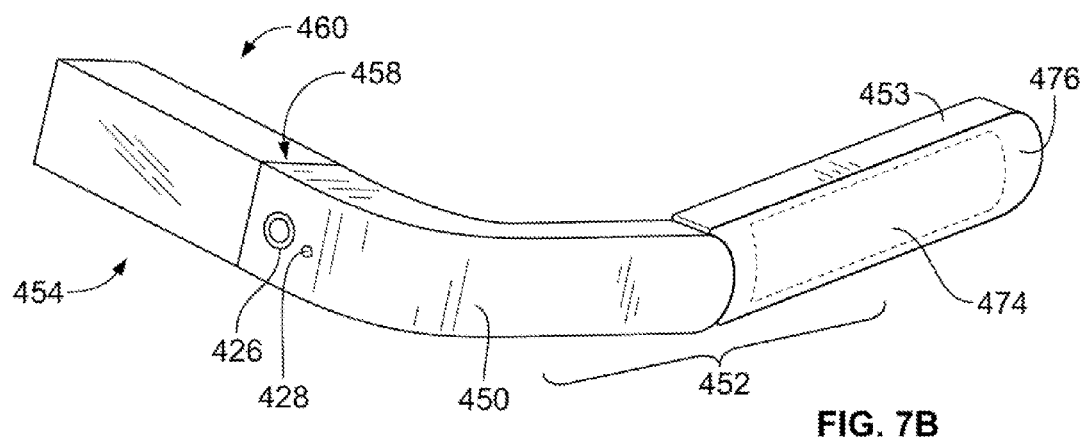
Figure 7C:
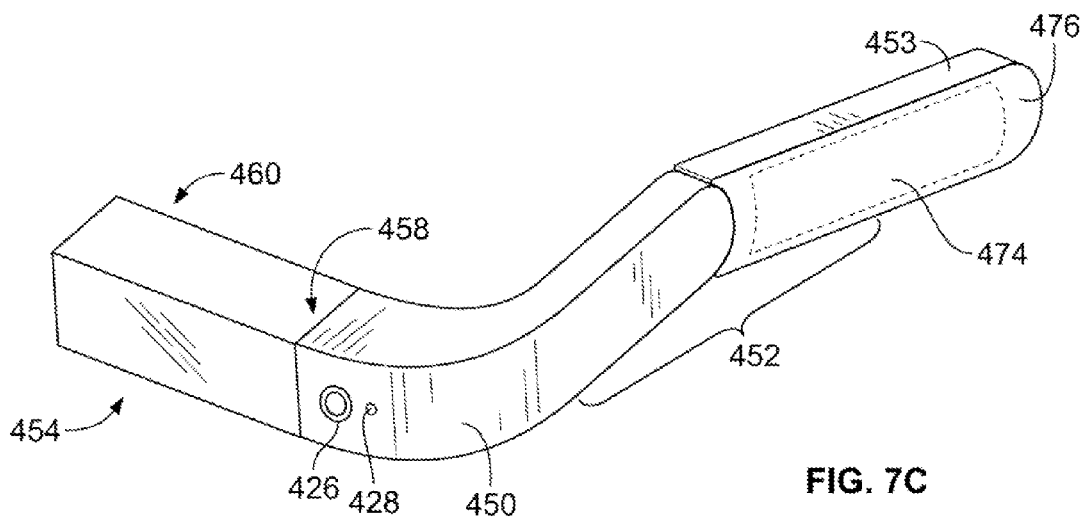

Boom 414 can have a housing 452 that is split into display and arm portions that rotate relative to each other as shown in FIGS. 7A-C. In the example shown in FIG. 5, housing 452 is divided into a display housing 475 and an arm housing 476. As shown, display housing 475 defines elbow portion 450 and has display 454 mounted thereon. Display housing 475 can also include a camera, as shown in other embodiments herein (for example camera 526 in FIG. 9). Arm housing 476 substantially defines the arm portion of boom 414 and can include touch-based input 470, which can be a discrete element or can be an operable surface 474 of housing 452, as described above. In an embodiment, the display portion 475 and arm portion 476 of housing 452 can be covered by a compliant outer layer (not shown). This outer layer can be made from a rubber material, for example, and can cover any joint between the two housing portions to give boom 414 a clean and uniform look. A rotating joint between display portion 475 and arm portion 476 can be used and can be formed by a separate element such as a pin or by integrally-formed features such as a post and a mating hole that can snap together. Additionally, an armature wire, a gooseneck feature, or a ball-and-socket joint can be assembled between the display portion 475 and the arm portion 476 to allow adjustment along additional axes. Such joints can also be covered by a compliant outer layer.

In this embodiment, display housing 475 can be rotatably affixed to arm housing 476. Boom 414 can then be attached to frame 412 by any structure discussed herein. The rotation of display housing 475 can implement an additional or alternative form of adjustment for the position of display 454 relative to the user's eye. As shown in FIG. 7B, display housing 475 can be rotated upward relative to arm housing 476. Further, as shown in FIG. 7C, display housing 475 can be rotated downward relative to arm housing 476. In an embodiment, the point of rotation 484 between display housing 475 and arm housing 476 can be positioned near the focal center of a user's eye. This can be approximated based on predetermined non-adjustable attachment structures on bands of varying sizes, as discussed above, or can be done though forward- and backward-adjustable attachment structures, such as those described above with respect to FIGS. 10-12.

Figure 8A:
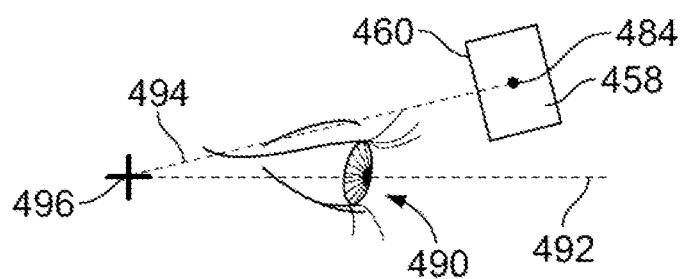
FIGS. 8A and 8B are schematic drawings illustrating aspects of the device of FIGS. 7A-C.
Figure 8B:
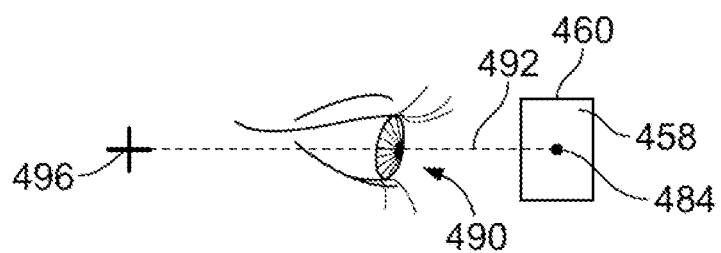

As shown in FIGS. 8A-B, in certain structures of display 454, such as certain display configurations (including the use of some types of prisms), it can be beneficial to orient display 454 such that viewing surface 460 is normal to a line from the image location within display 454 to the focal center of the user's eye. By allowing rotation of display housing 475 and, thus, display 454 to rotate relative arm housing 476, the display 454 can be positioned in an optimal angle for viewing by users with different facial structures and different preferences for the horizontal or vertical position of display 454 or frame 412. FIG. 8A shows display 454 at a location above the horizontal center 492 of the user's eye 490. Display 454 is pivoted or otherwise rotated about axis 484 that extends in a lateral direction relative to the user's face (in and out of the page of FIG. 8A) such that surface 460 is perpendicular to a line 494 extending between surface 460 and the focal center 496 of the user's eye 490. It is noted that the diagram shown in FIG. 8A is only an example and different users can have different locations of their eye's focal center. FIG. 8B shows display 454 positioned vertically near the horizontal center 492 of the user's eye with display rotated accordingly for optimal viewing by the user, as described above.

This adjustment can be such that the user can wear frame 412 on his or her head in a comfortable position and can then make adjustments to place display 454 in a desired or appropriately functional position. For example, the user may desire to position display directly in her line of sight (both vertically and horizontally) or may desire to have display 454 positioned above, below, or to the outside of his line of sight. Such positioning may vary depending on how the user is using device 410, making on-the-fly adjustments useful for some applications. In other embodiments, discussed below, such adjustment can be made within the attachment between the boom and the frame, while still permitting similar adjustments.

Additional input structures can be included in device 410. These can include a camera 426 and a sensor 428, as shown in FIG. 5. The camera can be used to take picture or record a video at the user's discretion. The camera can also be used by the device to obtain an image of the user's view of his or her environment to use in implementing augmented reality functionality. The sensor 428 can be, for example a light sensor that can be used by firmware or software associated with the camera 426. As shown in FIG. 5, the camera 426 and sensor 428 can be included in a secondary module 432 that is affixed to the arm 440B opposite the arm 440A to which boom 414 is affixed. In the example show in FIG. 5, secondary module 432 can be similar in appearance to boom 414 but lacking display 454 and not extending outward over the adjacent lens 418. Secondary module 432 can extend rearward of lens 418 in similar manner to arm portion 476 of boom 414. Further, secondary module 432 can include another touch-based input surface similar to that of boom 414. Secondary module 432 can connect with boom 414 or other structures within device 410 through embedded wiring or circuitry within frame 412 or the like. Embodiments that include a removable boom 414 or secondary module 432 can include attachment features to facilitate removable electronic connection with such wiring or circuitry. In other embodiments (such as that shown in FIG. 9), a camera 726 can be included in frame 712, such as in nosebridge 720.

In an embodiment, both boom 414 and secondary module 432 can be removably affixed on arms 440A and 440B such as by incorporation of mutually-engaging snap fit or press fit features. Such an arrangement can allow a user to exchange the sides to which the boom 414 and secondary module 432 are respectively attached. This can be useful to those who prefer display 454 to be positioned over a particular eye (right or left). For example, a right-handed person may prefer having the boom 414 on the right side of her head to make interaction with touch-based input 470 easier. In another example, a person may prefer to have the display 454 over a dominant eye for easier interaction with elements presented on display 454 or over a non-dominant eye to make it easier to shift his focus away from elements presented on display 454 when engaged in other activities. Both boom 414 and secondary module 432 can be configured to be symmetrical along a horizontal plane (relative to the general position of boom 414 when assembled with frame 412 and with assembly 410 being worn by a user) such that, for example, boom 414 can be rotated along the longitudinal axis of arm 476 to appropriately position display 454 inward of arm 476 and over the desired eye of the user. In such an arrangement, boom 414 and module 432 can each have an attachment structure that is vertically centrally located on arm 476 such that it can be reached by a corresponding attachment feature of frame 412 from either side thereof. Alternatively, boom 414 and module 432 can each include multiple attachment features in appropriate locations to make the desired attachment with frame 412 on either arm 440A or 444B. Frame 412 can also include attachment features, as will be discussed below, on both arms 440A and 440B to accommodate positioning of boom 414 on either side thereof or on one of arms 440A or 440B such that a particular frame 412 is designated as being right-side or left-side boom attachment.

In a further arrangement, two booms could be included, with one affixed on each arm 440A and 440B of frame 412 and corresponding to each eye of the user. As a further alternative, a single display 454 could be used with a prism or other structure configured to extend over both eyes of the user for displaying an image viewable by both eyes.

As mentioned previously, housing 452 can contain electronic circuitry such as the circuitry for touch based input 470. In addition housing 452 can include control circuitry for the image source associated with display 454, the camera 426, or the sensor 428, or one or more circuit boards including a processor to control display 454, touch based input 470 or to perform other functions for boom 414. Housing 452 can further include a power source, such as a battery to power the other circuitry. Additionally housing 452 can include memory, a microprocessor or communications devices, such as cellular, short-range wireless (e.g. Bluetooth), or WiFi circuitry for connection to a remote device. Additionally, any such circuitry can be included in band 414 such as in at least one of the earpieces 446, for example in an internal cavity thereof.

Figure 9:
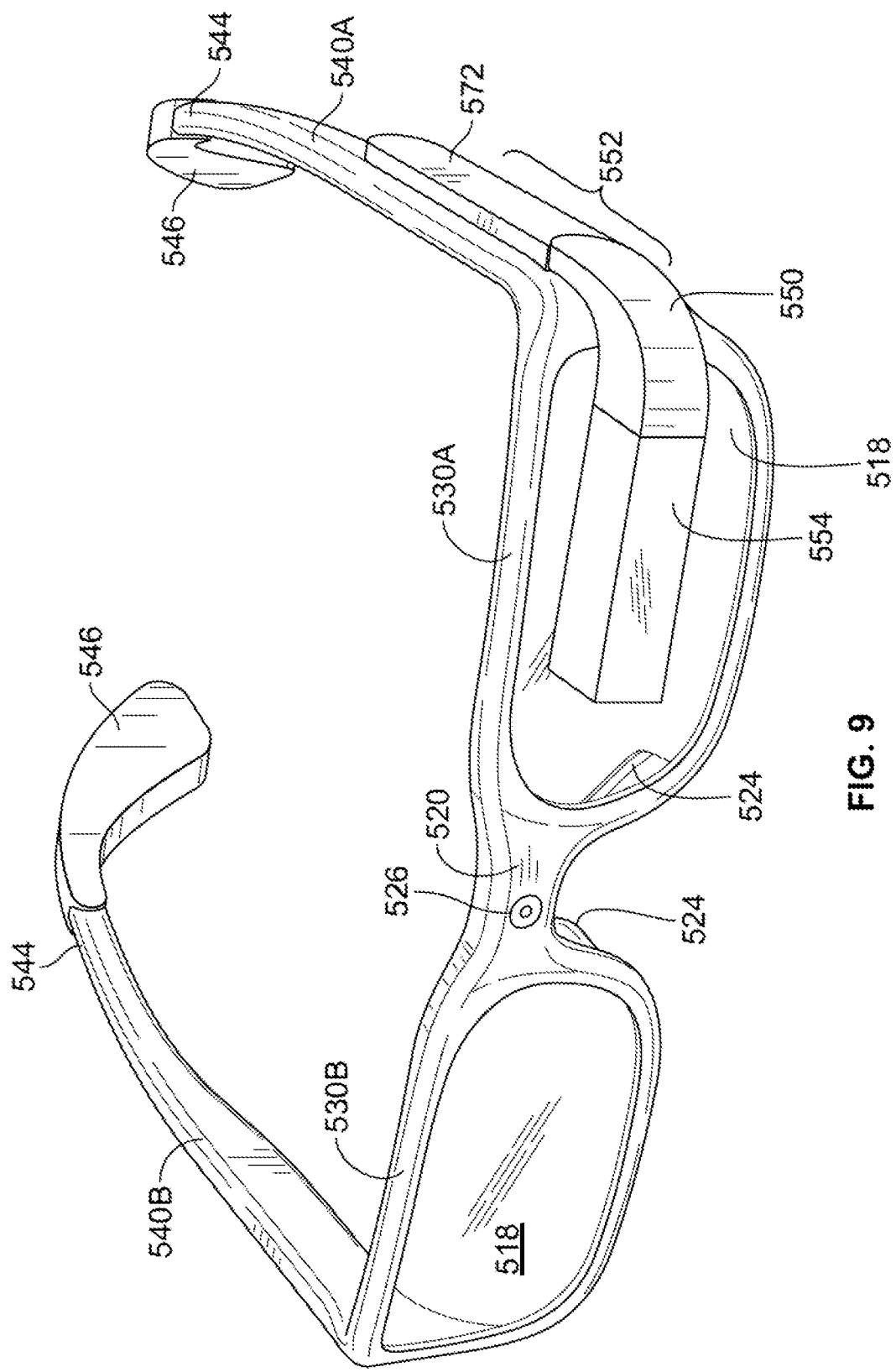
FIG. 9 shows an alternative embodiment of a wearable computer device according to another embodiment of the present disclosure.

As shown in FIG. 9, earpiece 546 can be configured to be positioned behind or over the ear of the user while being worn. Earpiece 546 can be further configured to contact a portion of the user's head to help secure the position of device assembly 510. Earpiece 546 can be configured to include a battery or multiple batteries of various forms, such as AAA, AA, or 9-volt style batteries. The battery can also be a rechargeable battery such as a lithium-ion or nickel-cadmium battery and can be removable by the user or can be permanent or semi-permanent. Earpiece 546 can also include a port (not shown) that can be used to connect device assembly 510 to a power source to recharge a battery without removal thereof or to connect device 510 to a remote device for communication therewith, such as described above, or to update or install software or firmware included in the memory of device 510.

Earpieces 546 can be integrally formed with arms 540A, 540B or can be separate elements that can be pre-assembled with arms 540A,540B. Alternatively, a number of different earpieces 546 can be provided that can be removably attached to ends 544 of arms 540 according to fit or the user's preferences. In such configurations, earpieces 546 can be made of different materials or material combinations than the remainder of band fame 512.

Earpiece 546 can be configured and positioned to provide a balancing weight to that of boom 514. Boom 514 is positioned forward of the user's ear, which can cause a portion of its weight to be supported by the nose of the wearer. By adding weight behind the user's ear (or shifting weight to behind the user's ear by relocating components) in the form of earpiece 546, the ear becomes a fulcrum about which the weight of boom 514 is balanced against that of the earpiece 546. This can remove some of the weight on the user's nose, giving a more comfortable, and possibly a more secure fit with reduced potential slipping of bridge 520 downward on the user's nose. The components within earpiece 546, such as a battery or various control circuitry can be arranged to contribute to a desired weight distribution for device 510. For example, heavier components, such as a battery, can be placed toward or away from boom on arm 540A to adjust the weight distribution. In an embodiment, a majority of the weight can be carried by the ear of the user, but some weight can still be carried by the nose in order to give the device a secure feel and to keep the bridge 520 in a desired position on the nose to maintain a desired position for display 454. In an embodiment, between 55% and 90% of the weight of device assembly 510 can be carried by the user's ear or ears. In some embodiments, it may be desired to have a comparatively greater portion of the weight borne by the user's nose. For example, the weight balancing can be configured such that between 40% and 75% of the weight of device 510 is applied to the user's nose. Further, in embodiments such as that shown in FIG. 9, the presence of boom 514 on one side of the user's head can create an unbalanced side-to-side weight distribution. In the embodiment of FIG. 5, the presence of secondary module 432 can create a more balanced side-to-side weight distribution. However, in unbalanced arrangements such as that of FIG. 9, it may be advantageous to have one of the earpieces 546 be heavier than the other. For example, in the embodiment shown, where boom 514 is affixed on arm 540A, it may be advantageous for the earpiece 546 on that same arm to be heavier than the opposite earpiece 546.

Figure 10:
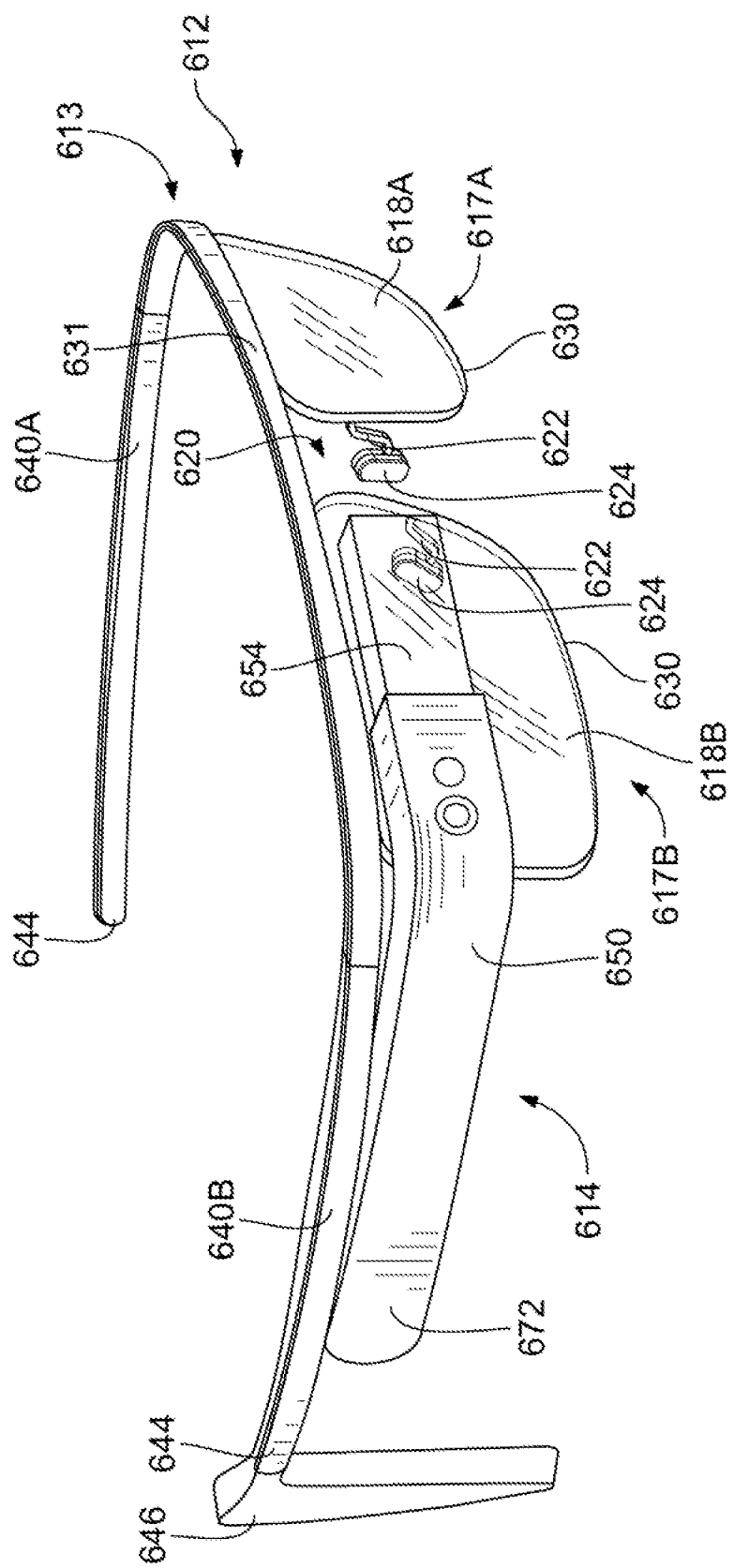
FIG. 10 shows another alternative embodiment of a wearable computer device according to another embodiment of the present disclosure.
Figure 11:
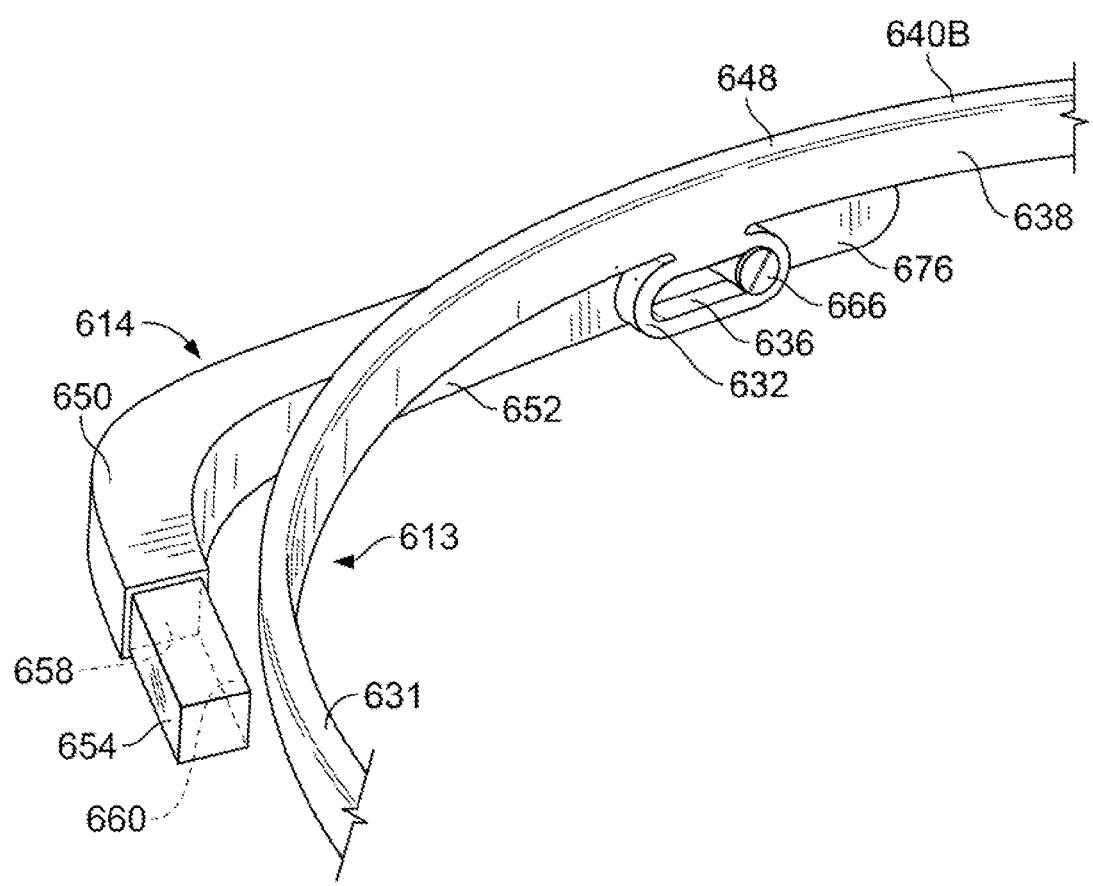
FIG. 11 shows detail of an aspect of the device of FIG. 10.
Figure 12:
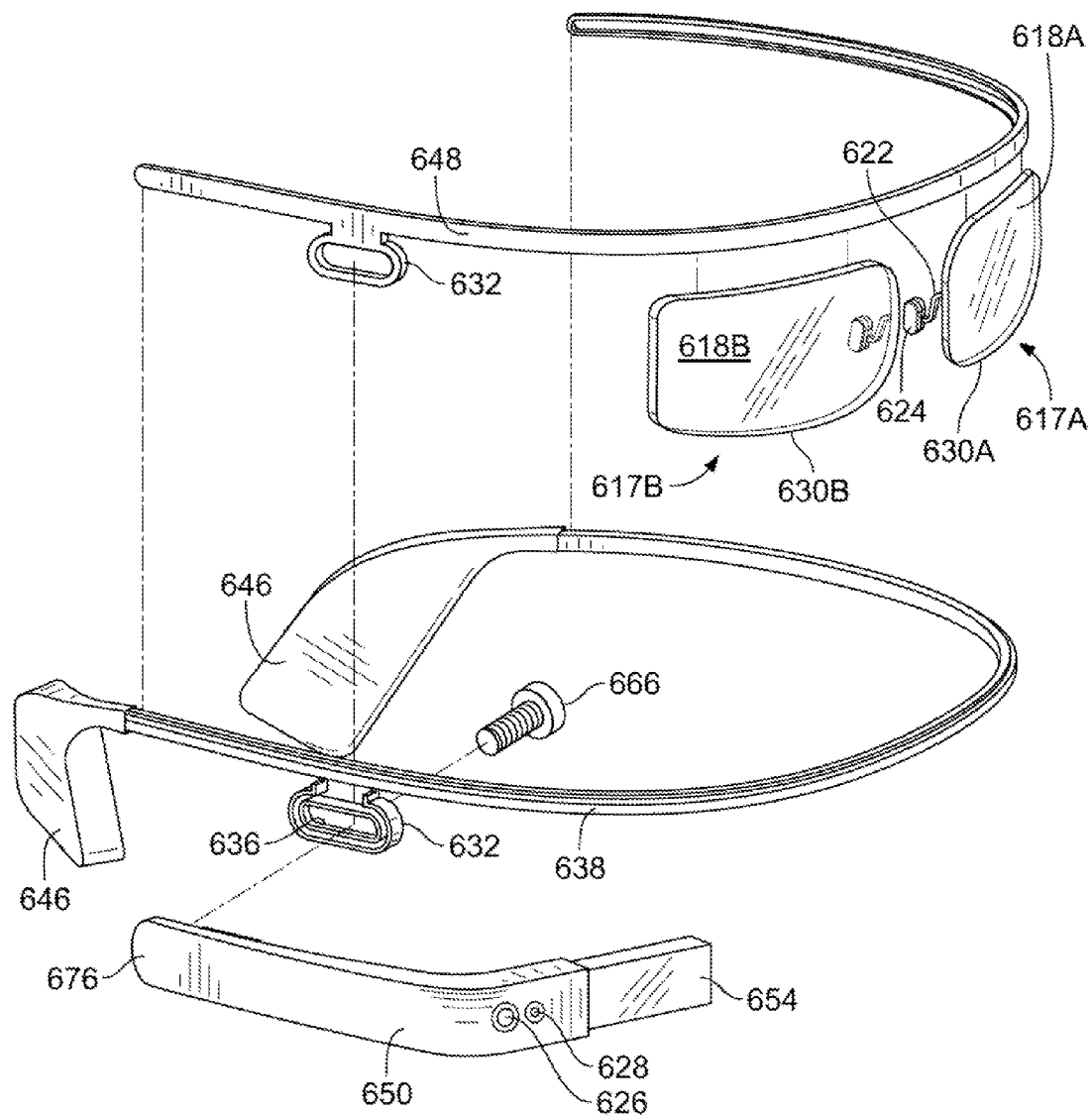
FIG. 12 shows an exploded view of the device of FIG. 10.

In the embodiment shown in FIGS. 10-12, frame 612 is of a configuration that includes separate assemblies 617A, 617B of a lens 613A,613B surrounded by a corresponding rim 630A,630B and having a bridge arm 622 attached thereto for supporting and appropriately positioning a pad 624. Each of these assemblies 617A,617B are configured to assemble with a band 613 including a central portion 631 having arms 640A,640B extending from opposing sides thereof. Boom 614 is affixed to either one of the arms 640A or 640B to position display 650 in the view of one of the user's eyes, as discussed above with respect to FIG. 5. Lens assemblies 617A,617B can attach to central portion 631 by various snap-fit or press-fit arrangements or can be removably affixed using screws or the like. Band 613 can be configured to fit on the head of a user with central portion 631 positioned over the brow of the user and supported in a position thereover by pads 624 that contact the nose of the wearer. In such a configuration, device 610 can be used and worn without lens assemblies 617A,617B assembled therewith. Without lens assemblies present, device 610 can be worn such that central portion 631 of band 613 makes contact with at least a portion of the user's brow or forehead to appropriately support and position display 650. Alternatively, a nosebridge assembly (not shown) can be assembled to central portion 631 of band 613 to allow band 613 to be supported by the nose of the user with no lenses present.

Band 613 can be of a flexible construction to bend in response to different head shapes. Band 613 can be made from a resiliently flexible material or combination of materials. Such a construction can permit arms 640A,640B, including ends 644 thereof to flex outwardly away from each other to accommodate heads of different sizes. Further, the structure can be configured so that at a resting, or un-flexed, position (such as when not being worn) band 613 is somewhat smaller than necessary to accommodate the smallest size head for which band 613 is configured. This may require some degree of flexing by band 613 when worn, resulting in band 613 applying a force against the user's head due to its tendency to return to its undersized resting position. Such a force can help retain band 613 on the user's head, with or without the further retention provided by earpieces 646. At least a portion of the arms 640, such as the areas thereof that make contact with the user's head, can be made from or otherwise coated with a rubber or another high-friction material. The use of rubber or the like in these contact areas can also increase the comfort to the user by spreading out the contact more evenly. Such a structure can achieve at least three points of contact with the user's head, which can give a desired level of stability to the device 610, when worn.

As shown in FIG. 10, device 610 has a band 613 that includes a compliant inner portion 638 and a resilient outer portion 648. This arrangement is further illustrated in the exploded view of FIG. 12. Inner portion 638 can include any portions of the band 613 that are intended to contact the user's head. In the particular embodiment shown, inner portion 638 can define the entire inner surface 639 of band 613 to ensure that the compliant material of inner portion makes contact with the user's head regardless of the area of band 612 along which contact is made with the user's head. Inner portion 638 can be made of any material that can provide a degree of compliance to enhance the comfort of the fit of band 612 on the user's head while being able to retain its general shape. Acceptable materials include various foams, such as foam rubber, neoprene, natural or synthetic leather, and various fabrics. In an embodiment, inner portion 638 is made from an injection-molded or cast TPE. The compliance of the material of inner portion 638 can be measured by the durometer of the material. In an example, inner portion 638 can be made from TPE having a durometer of between 50 and 70. Inner portion 638 can also be formed having a hollow passage therethrough or a channel formed therein opposite inner surface 639. Such a passage or channel can be used to route any wiring associated with boom 614. For example, in an embodiment a battery (not show) can be housed in one of the earpieces 646 of frame 612 that can be connected with the internal components of boom 614 to provide power therefor. This connection can be made by wired routed through a channel or hollow passage through inner portion 638.

Outer portion 648 of band 613 can be made of a resiliently flexible material such as metal or plastic. In general, the nature of such a material should be such that outer portion 648 can maintain the desired shape for band 613 while allowing some flexibility so that band 613 can expand to fit on a user's head while applying a comfortable pressure thereto to help retain band 613 on the user's head. In some embodiments, outer portion 648 can be elastically deformable within a range that will allow it to be worn as such on a user's head and plastically deformable above the elastically deformable range to allow the user to make adjustments to the shape of band 648. In other embodiments, outer portion 648 is elastically deformable up to a sufficiently high threshold that a user is sufficiently unable to permanently alter the shape of band 613. Acceptable materials for outer portion 648 include metals such as aluminum, nickel, titanium (including grade 5 titanium), various steels (including spring steel, stainless steel or the like), or alloys including these and other metals. The thickness of outer portion 648 can be adjusted, depending on the material used, to give the desired flexibility characteristics.

As shown in the exploded view of FIG. 12, (which also illustrates an alternative example having two earpieces 646, one on each end 544 of the respective arms 640A,640B) inner portion 638 can have a profile such that it at least partially fits within a channel 649 formed by outer portion 648. In the example shown, inner portion 638 can be sized to fit within channel 649 along a relatively narrow portion thereof opposite inside surface 639. Inner portion 638 can then extend inward past outer portion 648 and can be relatively wider along such a portion, which can include inner surface 639. Channel 649 can be configured to also accept any wiring of band 612 therein or to close a partially open channel formed in inner portion 639 to hold such wiring.

Further, earpieces 646 can be integrally formed with inner portion 638 and can extend beyond ends 644 of outer portion 648. In these embodiments, inner portion 638 can include internal support within the portions thereof that form earpieces 646. Such internal support can include electronics housings that can contain batteries or other electronic circuitry associated with device 610. The internal support can also include resilient members such as spring elements (not shown) to help provide flexion of band 613 and retention pressure against a wearer's head. Such spring elements can also be plastically deformable to allow for user adjustment of the earpieces 646. Lengths of armature wire can be used to provide such characteristics. Any internal support within earpieces 646 can extend into the area of inner portion 638 that is within outer portion 648 to provide additional support therefor.

As shown in FIG. 11, boom 414 can be configured to attach to band 613 such that boom 614 is positioned beneath band 612 when in a position as when worn on a user's head. This configuration can be advantageous due to the relative positions desired for display 654 and central portion 631 of band 613. In particular, with central portion 631 in a position over the brow of the user, it may be desired to have display 654 positioned vertically below central portion 630 such that it is in at least a portion of the user's line of sight. Accordingly, in an embodiment this positioning is achieved by attaching boom 614 to band 613 such that boom 614 is beneath band 613, with exception made for any interacting attachment elements of band 613 or boom 614. Other arrangements are possible, such as boom 614 attaching to band 613 in an overlapping manner, with boom 314 positioned to the outside of band 613 at the point of attachment.

As shown in FIG. 11, the attachment feature 632 of band 613 includes a track 636 that extends along a length of arm 640A (a similar feature can also or alternatively be positioned on arm 640B). Boom 614 includes an attachment feature 662 including a screw 666, the shank of which fits securely within track 636 with the head of screw 666 extending outward along the body of the attachment feature 632. In such an arrangement, boom 614 can be affixed to attachment feature 632 using screw 666 such that boom 614 can be moved forward and backward relative to band 613 by sliding screw 666 within track 636. Screw 666 can then be tightened into housing 652 to secure the position of boom 614 relative to band 612. Such adjustment can provide various forms of "eye relief" such as by compensating for different eye positions such as for users with deep-set eyes or with eyes positioned relatively close to brow.

Additionally, the eye relief provided by the forward and backward adjustability of attachment 632 can allow display 654 to be positioned clear of the user's eyelashes including those of users with relatively long eyelashes. Screw 666 can then be tightened into housing 652 to secure the position of boom 614 relative to band 612. Housing 652 can be configured to permit some rotation of boom 614 relative to attachment portion 632 such that the rotational position of boom 614 can also be fixed by tightening screw 666 into housing 652. This attachment can also incorporate a spring (not shown) or the like positioned between housing 652 and attachment feature 632 such that boom 614 is biased away therefrom. This can allow the lateral position of boom 614, and thus display 654, to be adjusted by tightening screw 666, which can draw housing 652 closer to attachment feature 632. In either arrangement, boom 614 can be disassembled from band 613 by loosening screw 666 until it is removed from housing 452. Other, similar arrangements are possible, including sliding joints such as dovetails or the like, which can be locked in place using set screws or the like.

Track 636 can include conductive features such as exposed wire segments or traces partially embedded therein that can align with further conductive features positioned on housing 652 of boom 614 to allow connection between electronic elements in the band 612 and the electronic components (including the image source or touch-based input 670) in boom 614. In other embodiments, an external wire (not shown) can extend out from band 613 and plug into an outlet (not shown) on boom 614 to achieve a desired electrical connection therebetween. Band 613 can include additional wires that run through at least a portion thereof to further connect such components that may be located remotely from each other.

In a commercial setting, a number of different bands 613 can be provided that are configured to fit different ranges of head sizes, such as "small", "medium", and "large". These can be provided with a boom 614 that is configured to attach to each of the differently-sized bands in a desired manner and a pair or pairs of lens assemblies 617. Alternatively booms 614, lens assemblies 617, and differently-sized bands 613 can be sold separately, allowing a purchaser to select the desired band and a boom to assemble together, with or without lens assemblies. In an example, lens assemblies can be sold with lenses according to a user's prescription or can be tinted in the form of sunglasses. Bands 613 in such a setting can also be provided in different fit styles (such as with earpieces or without or in varying shapes) or colors to allow further purchaser customization.

Additional components can be included in the various device assemblies described herein. These components can include additional inputs, control circuitry boards, antennae or the like. The various locations in which these additional components are located on or in such a device assembly can also be selected to allow for a predetermined weight distribution.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electronic device, comprising:
   a frame configured to be worn on the head of a user, the frame including first and second rims and a bridge portion positioned between the first and second rims, the bridge portion being configured to rest on a portion of the nose of the user, the frame further including first and second temple portions extending away from the rims to respective ends thereof, wherein the first and second temple portions are configured to be positioned over respective first and second temples of the user with the ends disposed near first and second ears of the user;
   a display element having a viewing surface configured to be positioned in front of an eye of the user;
   a housing having an arm portion affixed to the first temple portion of the frame and defining a longitudinal axis, the arm portion further including an outer wall, and the housing also including an elbow portion defining a display end of the housing and supporting the display element such that the display element extends along a display axis that is angled with respect to the longitudinal axis;
   image generating means disposed within the elbow portion of the housing and configured for generating an image presentable to the user on the display element; and
   an input device having touch-sensitive circuitry disposed within the housing such that at least a portion of the outer wall of the housing is configured as a touch-based input surface, the input device configured to provide a tactile feedback to a user when the user contacts the touch-based input surface and configured for receiving from the user an input associated with a control function executed by a processor mounted within the housing.

2. The device of claim 1, wherein the elbow portion is configured to extend at least partially along the longitudinal axis through a portion thereof adjacent the temple portion such that the display element is positioned at a distance away from a focal center of the eye of the user in a direction along the display axis.

3. The device of claim 2, wherein the arm portion of the housing contacts the temple portion of the frame therealong, and the elbow portion of the housing is spaced apart from the frame.

4. The device of claim 2, wherein the elbow portion is curved so as to extend away from the arm portion in an arcuate fashion to the display end of the housing.

5. The device of claim 2, wherein the arm portion and the elbow portion are discrete elements rotatably affixed to each other about an axis substantially parallel to the display axis such that the display element is adjustable toward and away from a brow of the user by rotation of the elbow portion relative to the arm portion.

6. The device of claim 1, wherein the display axis is angled at between about 80° and 100° with respect to the longitudinal axis.

7. The device of claim 1, wherein the input device is positioned in the arm portion, and wherein the image generating means are positioned in the elbow portion.

8. The device of claim 1, wherein the housing within the arm portion overlies the first temple portion such that the touch-based input surface is positioned along the temple portion.

9. The device of claim 1, wherein the arm portion of the housing is removably affixed to the first temple portion of the frame.

10. The device of claim 1, wherein the first and second temple portions are rotatably affixed to the rims such that frame is selectively positionable in a folded configuration and a wearable configuration.

11. The device of claim 1, wherein the display element is a generally transparent prism configured to combine the image presentable to the user thereon with a user view through the display element.

12. The electronic device of claim 1, wherein the touch-based input surface includes an edge boundary defining an operable area, the edge boundary including one of a raised, indented, or roughened surface.

13. The electronic device of claim 1, wherein the touch-based input surface comprises a textured surface configured to provide tactile feedback to the user when the user contacts the touch surface.

14. An electronic device, comprising:
   a frame configured to be worn on the head of a user, the frame including first and second rims and a bridge portion positioned between the first and second rims, the bridge portion being configured to rest on a portion of the nose of the user, the frame further including first and second temple portions extending away from the rims to respective ends thereof, wherein the first and second temple portions are configured to be positioned over respective first and second temples of the user with the ends disposed near first and second ears of the user;

a display element having a viewing surface configured to be positioned in front of an eye of the user;

a housing having an arm portion affixed to the first temple portion of the frame and defining a longitudinal axis, the arm portion further including an outer wall, and the housing also including an elbow portion defining a display end of the housing and supporting the display element such that the display element extends along a display axis that is angled with respect to the longitudinal axis;

control circuitry disposed within the housing, the control circuitry including image generating means configured for generating an image presentable to the user on the display element;

a camera having a lens thereof, the camera being mounted within the frame such that the camera lens is exposed and is directed substantially parallel to the longitudinal axis, the camera further being electrically connected with the control circuitry through the frame; and an input device having touch-sensitive circuitry disposed within the housing such that at least a portion of the outer wall of the housing is configured as a touch-based input surface connected with the control circuitry, the input device configured to provide a tactile feedback to a user when the user contacts the touch-based input surface and configured for receiving from the user an input associated with a function related to the camera.

15. The device of claim 14, wherein the function is related to information that is presentable on the display element.

16. The device of claim 14, wherein the camera is mounted within the bridge portion of the frame.

17. The device of claim 14, wherein the camera is mounted within the second temple portion.

18. The device of claim 17, wherein the second temple portion includes a camera housing portion in which the camera is mounted, and wherein the camera lens is exposed on the camera housing portion.

19. The device of claim 18, wherein the camera housing portion includes a side wall and input means disposed along the side wall.

20. The electronic device of claim 14, wherein the touch-based input surface comprises a textured surface configured to provide tactile feedback to the user when the user contacts the touch surface.

* * * * *